US007785746B2

United States Patent
Mitchell et al.

(10) Patent No.: US 7,785,746 B2
(45) Date of Patent: Aug. 31, 2010

(54) FUEL CELL OXYGEN REMOVAL AND PRE-CONDITIONING SYSTEM

(75) Inventors: Philip J. Mitchell, London (GB); Paul L. Adcock, London (GB)

(73) Assignee: Intelligent Energy Limited, Kent (GB)

( * ) Notice: Subject to any disclaimer, the term of this patent is extended or adjusted under 35 U.S.C. 154(b) by 1149 days.

(21) Appl. No.: 10/501,759

(22) PCT Filed: Jan. 15, 2003

(86) PCT No.: PCT/GB03/00169

§ 371 (c)(1), (2), (4) Date: Jan. 10, 2005

(87) PCT Pub. No.: WO03/063278

PCT Pub. Date: Jul. 31, 2003

(65) Prior Publication Data

US 2005/0106445 A1    May 19, 2005

(30) Foreign Application Priority Data

Jan. 18, 2002 (GB) .................... 0201114.6

(51) Int. Cl.
*H01M 8/04* (2006.01)
(52) U.S. Cl. .............. 429/432; 429/417; 429/456
(58) Field of Classification Search ............ 429/38, 429/26, 22, 17
See application file for complete search history.

(56) References Cited

U.S. PATENT DOCUMENTS

| 4,537,839 A | 8/1985 | Cameron |
| 4,657,826 A | 4/1987 | Tajima |
| 4,657,828 A | 4/1987 | Tajima |
| 4,755,439 A * | 7/1988 | Trocciola et al. .......... 429/22 |
| 6,007,931 A | 12/1999 | Van Dine et al. |
| 6,376,113 B1 | 4/2002 | Pledger et al. |
| 6,544,676 B2 * | 4/2003 | Lim et al. ................ 429/19 |

(Continued)

FOREIGN PATENT DOCUMENTS

DE    19956221    5/2000

(Continued)

OTHER PUBLICATIONS

Search Report dated May 19, 2003 for Application No. GB0201114.6.

(Continued)

*Primary Examiner*—Patrick Ryan
*Assistant Examiner*—Thomas H. Parsons
(74) *Attorney, Agent, or Firm*—Fish & Richardson P.C.

(57) ABSTRACT

A fuel cell having an anode, a cathode and an ion exchange membrane is supplied by hydrogen fuel through an anode fuel delivery conduit. A recirculation loop is provided to recycle gases in the fuel delivery conduit to a mixing point where a controlled flow rate of fuel is supplied and mixed therewith. Any oxidant species remaining in the fuel delivery conduit are thereby combusted in a controlled manner to avoid damage to the fuel cell membrane-electrode assembly. Small quantities of oxidant may be deliberately introduced into the fuel delivery conduit to generate water vapor and heat to pre-condition the fuel delivered to the anode. Such preconditioning assists in hydration control of the membrane, and temperature control of the membrane-electrode assembly for optimum fuel cell performance.

28 Claims, 3 Drawing Sheets

U.S. PATENT DOCUMENTS

| | | |
|---|---|---|
| 7,435,501 B2 | 10/2008 | Peace |
| 7,498,094 B2 | 3/2009 | Hood et al. |
| 2003/0104256 A1 | 6/2003 | Van der Woude et al. |
| 2005/0048351 A1 | 3/2005 | Hood et al. |
| 2005/0106445 A1 | 5/2005 | Mitchell et al. |
| 2005/0202304 A1 | 9/2005 | Peace |
| 2006/0154130 A1 | 7/2006 | Hood et al. |
| 2006/0257699 A1 | 11/2006 | Hood et al. |
| 2006/0292429 A1 | 12/2006 | Baird et al. |
| 2007/0166596 A1 | 7/2007 | Benson |
| 2008/0145738 A1 | 6/2008 | Benson |
| 2008/0248336 A1 | 10/2008 | Matcham et al. |
| 2008/0314660 A1 | 12/2008 | Peace et al. |
| 2009/0029231 A1 | 1/2009 | Hood et al. |

FOREIGN PATENT DOCUMENTS

| | | |
|---|---|---|
| DE | 10033036 A1 | 1/2001 |
| EP | 0 550 892 | 9/1996 |
| GB | 0201114.6 | 7/1923 |
| JP | 1124962 | 5/1989 |
| JP | H01-117277 | 5/1989 |
| JP | 5089899 * | 4/1993 |
| JP | 07-090111 | 4/1995 |
| JP | H09-27338 | 1/1997 |
| JP | 11-040179 | 2/1999 |
| JP | 11040479 | 2/1999 |
| JP | 2000195534 A | 7/2000 |
| JP | 2001-43873 | 2/2001 |
| JP | 2001-266922 | 9/2001 |
| WO | WO99/27598 | 6/1999 |
| WO | WO/00/19084 A1 | 4/2000 |
| WO | WO/01/26174 A1 | 4/2001 |
| WO | WO01/39310 | 5/2001 |
| WO | WO01/45188 | 6/2001 |
| WO | WO/01/50541 A1 | 7/2001 |
| WO | WO01/97310 | 12/2001 |

OTHER PUBLICATIONS

Australian Search Report dated Sep. 6, 2004 for Application No. SG 200304663-8.

International Search Report dated Oct. 19, 2004 for Application No. PCT/GB03/00169.

"Fuel Cells and Their Applications" by K. Kordesch & G Simadar VCH Verlagsgesellschaft mbH 1996. ISBN 3-527-28579-2, pp. 302-309.

EP Examination Report in Application No. EP03700382.9, dated Jun. 13, 2005.

Response under Article 96(2) EPC as filed in counterpart EP Application No. 03700382.9, dated Dec. 12, 2005.

Examination Report in Canadian Application No. 2,473,553, dated Sep. 9, 2009.

English Translation of Notification of Reason for Refusal in Japanese Application No. 2003-563030, dated Jul. 22, 2009.

English Translation of Examination Report in Japanese Application No. 2003-563030, dated Apr. 14, 2010.

* cited by examiner

FUEL CELL OXYGEN REMOVAL AND PRE-CONDITIONING SYSTEM

TECHNICAL FIELD

The present invention relates to fuel cells, and in particular to methods and apparatus for controllably removing oxidants in a fuel cell fuel supply stream.

BACKGROUND

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. The polymer membrane allows protons to traverse the membrane, but blocks the passage of electrons. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. The fluid flow field plates 14, 15 are formed from an electrically conductive, non-porous material by which electrical contact can be made to the respective anode electrode 12 or cathode electrode 13. At the same time, the fluid flow field plates must enable the delivery and/or exhaust of fluid fuel, oxidant and/or reaction products (and/or other diluent gases not taking part in the reaction) to or from the porous electrodes. This is conventionally effected by forming fluid flow passages in a surface of the fluid flow field plates, such as grooves or channels 16 in the surface presented to the porous electrodes.

FIG. 2 shows a plan view of a typical fluid flow channel 16 arranged as a serpentine structure 20 in a face of the anode 14 (or cathode) having an inlet manifold 21 and an outlet manifold 22. Many different configurations of fluid flow channel may be used.

In a typical application, in the anode fluid flow field plate 14, hydrogen gas is delivered into the serpentine channel 20 from the inlet manifold 21. In the cathode fluid flow field plate 15, oxidant (eg. oxygen gas) is delivered into the serpentine channel 20 from the inlet manifold.

Prior to the start up of a fuel cell 10 after first assembly, commissioning, repair, prolonged periods of inactivity or stand-by there can be an accumulation of air in the fuel flow channels and fuel delivery conduits, ie. generally within the fuel delivery path of the fuel cell. There is therefore a need to remove this air, or more particularly to remove the oxygen in the air, from the anode fuel delivery path before the introduction of any hydrogen fuel or a hydrogen rich gas mixture to the anode 12 and membrane 11.

This removal of oxygen prior to delivery of fuel is important to prevent undesirable uncontrolled catalytic combustion occurring at the surface of the anode 14 resulting in localized heating, dehydration and possible puncture of the proton exchange membrane 11.

In the prior art, it is common practice to purge the anode channels 16 and other portions of the fuel delivery conduits by passage of an inert gas, such as nitrogen, for a period of time prior to introduction of hydrogen fuel.

This process necessitates a local supply of nitrogen, generally contained in a pressure cylinder, and its periodic replacement. It is desirable to eliminate this requirement and thereby simplify the operational and service needs of the system. This is particularly important when the fuel cell is already installed in the field, eg. as part of a power system in a vehicle where accessibility of a purge gas, and indeed accessibility to the fuel cell, may be limited.

SUMMARY

It is an object of the present invention to provide a convenient method and apparatus for the removal of oxygen from the fuel delivery conduits of an electrochemical fuel cell.

It is a further object of the present invention to provide an apparatus by which the removal of oxygen from the fuel delivery conduits of an electrochemical fuel cell may be effected automatically.

A further problem associated with startup of fuel cells is that the membrane-electrode assembly generally operates with optimum performance only once it has reached an ideal operating temperature and an ideal degree of hydration of the membrane. Conventionally, such an optimum performance level is not achieved until after a period of operation of the fuel cell.

It is a further object of the invention to provide an apparatus by which a fuel and/or oxidant gas stream is pre-conditioned to accelerate hydration of the membrane-electrode assembly and/or to accelerate heating of the membrane-electrode assembly towards an optimum operating condition.

According to one aspect, the present invention provides a fuel cell including an anode, a cathode, and an ion exchange membrane therebetween, and having a fuel delivery conduit for supplying fuel from a fuel source to an active surface area of the anode and further comprising means for effecting a controlled combustion of fuel and oxidant species within the fuel delivery conduit.

According to a further aspect, the present invention provides a fuel cell system including:
  a fuel cell having an anode, a cathode, and an ion exchange membrane therebetween;
  a fuel delivery conduit comprising:
    a fluid flow field plate forming part of the anode, having a fluid flow channel extending therethrough;
    a fuel delivery inlet coupled to one end of the fluid flow channel; and
    a fuel delivery outlet coupled another end of the fluid flow channel;

the fuel cell system further comprising
  a recirculation conduit extending between the fuel delivery outlet and a mixing point in the fuel delivery inlet.

According to a further aspect, the present invention provides a fuel cell system including:
  a fuel cell having an anode, a cathode, and an ion exchange membrane therebetween;
  a fuel delivery conduit for delivering preconditioned fuel to the anode comprising:
    a reaction chamber for reacting fuel and oxidant;
    a fuel supply inlet for delivering fuel to the reaction chamber;
    an oxidant supply inlet for supplying oxidant to the reaction chamber; and
    a reaction chamber outlet connected to the anode;

the reaction chamber being adapted so that at least a part of the fuel supply delivered thereto to is reacted with the oxidant supplied thereto to precondition the fuel being delivered to the anode.

According to a further aspect, the present invention provides a fuel cell system including:
a fuel cell having an anode, a cathode, and an ion exchange membrane therebetween;
an oxidant delivery conduit for delivering preconditioned oxidant to the cathode comprising:
a reaction chamber for reacting fuel and oxidant;
a fuel supply inlet for delivering fuel to the reaction chamber;
an oxidant supply inlet for supplying oxidant to the reaction chamber; and
a reaction chamber outlet connected to the cathode;
the reaction chamber being adapted so that at least a part of the oxidant supply delivered thereto to is reacted with the fuel supplied thereto to precondition the oxidant being delivered to the cathode.

According to a further aspect, the present invention provides a method of operating a fuel cell having an anode, a cathode, and an ion exchange membrane therebetween, comprising the steps of:
supplying fuel from a fuel source to an active surface area of the anode by way of a fuel delivery conduit; and
effecting a controlled combustion of fuel and oxidant species with the fuel delivery conduit.

According to a further aspect, the present invention provides a method of operating a fuel cell having an anode, a cathode, and an ion exchange membrane therebetween, comprising the steps of:
supplying fuel from a fuel source to an active surface area of the anode by way of a fuel delivery conduit; and
reacting fuel and oxidant in a reaction chamber upstream of the anode to precondition the fuel being delivered to the anode.

DESCRIPTION OF THE DRAWINGS

Embodiments of the present invention will now be described by way of example and with reference to the accompanying drawings in which.

DETAILED DESCRIPTION

One method of achieving oxygen removal from the fuel delivery path is to utilize the oxygen in a controlled catalytic combustion of hydrogen external to the fuel cell.

Figure 1:
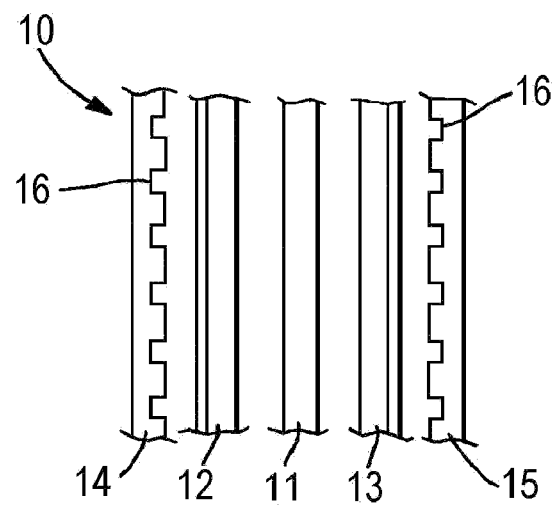
FIG. 1 is an exploded cross-sectional view of a prior art fuel cell.
Figure 2:
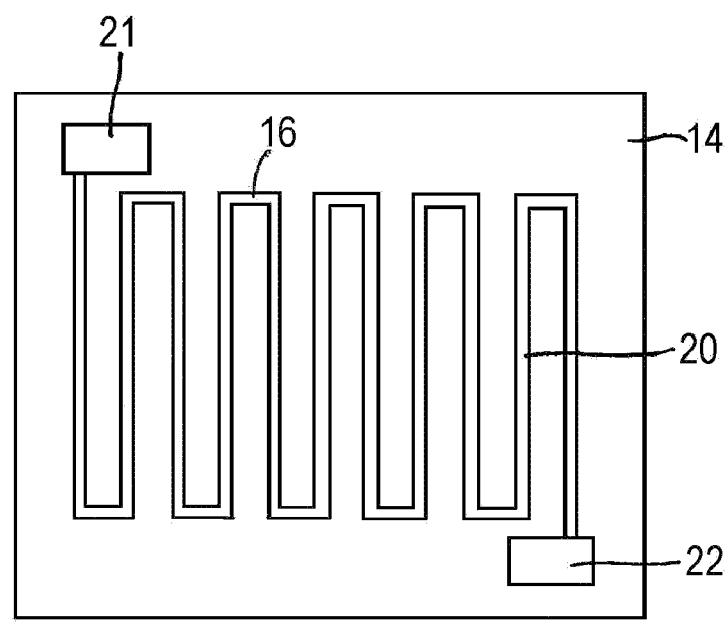
FIG. 2 is a plan view of a fluid flow field plate in the fuel cell of FIG. 1.
Figure 3:
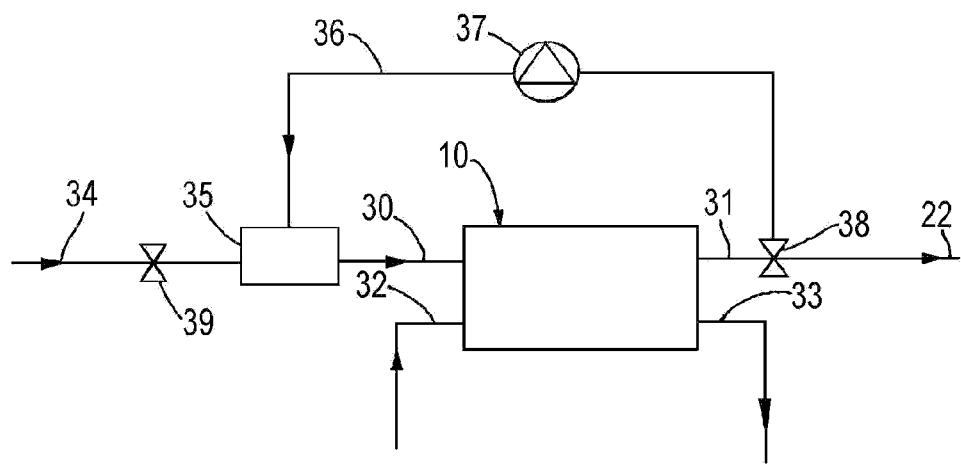
FIG. 3 is a schematic diagram of a first arrangement of an oxygen removal system according to the present invention.

With reference to FIG. 3, a fuel cell 10 is coupled to fuel delivery conduits 30, 31 and oxidant/exhaust conduits 32, 33. The fuel delivery conduits 30, 31 respectively provide an inlet 30 and outlet 31 for delivery to and from the anode fluid flow field plate 14 (FIG. 1) while the oxidant supply conduit 32 provides a supply of the oxidant to an inlet end of the cathode fluid flow field plate 15 and the exhaust conduit 33 provides an outlet to exhaust unused oxidant and reaction products from the cathode.

A fuel supply (eg. hydrogen) is coupled to a system inlet 34 which is fed to a reaction chamber 35. A recycle loop 36 extends between outlet 31 and the reaction chamber. The recycle loop 36 incorporates a pump 37 and can be switched into operation using a two way valve 38.

The reaction chamber 35 contains a suitable catalytic material dispersed on a support, to enable the removal of oxidants passing therethrough, according to techniques well known in the art. Presently preferred catalytic materials include precious metals such as platinum or platinum alloys dispersed on a ceramic support such as alumina.

In a normal mode of use, a hydrogen fuel supply is provided to the fuel cell 10 by way of system inlet 34, preferably via a flow regulator or metering valve 39. The hydrogen fuel passes into the inlet manifold 21 and anode fluid flow field plate 14 (FIG. 1) where it is at least partially consumed. Any unconsumed fuel or inert diluent fluid in the fuel supply may be exhausted via a fuel system outlet 22, when the two way valve 38 is switched to an exhaust position.

When the anode (fuel) stream is determined to be contaminated, or when it is suspected to be contaminated, by oxidant fluid, the system is switched to a recirculation mode of use. In this configuration, the two way valve 38 is switched so that the fuel cell outlet 31 is connected to the recycle loop 36. If necessary to maintain fluid circulation, the recycle pump 37 is switched on. In this manner, the anode fluid stream is recirculated, passing through reaction chamber 35 where oxidant species are scrubbed from the fluid stream, preferably by reaction with a controlled bleed of hydrogen gas from fuel system inlet 34 and flow regulator 39.

In this manner, combustion of hydrogen and oxidant species is effected only in the reaction chamber 35 and not in the fuel cell 10.

The recirculation mode of use may be initiated according to any desired prevailing condition. These conditions may include any one or more of the following: (i) automatic detection of oxidant in the fuel delivery conduit inlet 30 and/or outlet 31 by means of an appropriate sensor mechanism (to be described later); (ii) automatic detection of a period of non-use of the fuel cell exceeding a predetermined elapsed time threshold; (iii) automatic detection of a period of use of the fuel cell exceeding a predetermined elapsed time threshold; (iv) automatic detection of a service condition, ie. after detection of a fuel cell maintenance condition; and (v) manual initiation, by a user.

During the recirculation mode, the gases in the fuel cell can be recirculated around the recycle loop 36 and through the reaction chamber 35 into which the hydrogen gas is being introduced in a controlled manner, until all of the unwanted oxygen is eliminated. This recirculation mode may continue automatically for a predetermined period of time, or may be continued automatically until detection of reduction of unwanted oxidant species to below a predetermined threshold. Alternatively, the duration of the recirculation mode may be controlled manually by the user.

The metered supply of hydrogen fuel from the flow regulator 39 ensures that combustion of the fuel and oxidant is restricted to the volume of the reaction chamber 35 and that no combustion takes place within the fuel cell itself.

The presence of an oxidant species in the fuel delivery conduits and in the anode conduits may be detected by a number of methods. A low, near zero, open circuit voltage of the fuel cell stack 10 is often a good indicator of the presence of oxygen on the anode electrode face. Once this oxygen has been substantially removed, then the hydrogen will break through the reaction bed and transfer to the fuel cell anode surface thereby elevating the open circuit voltage and indicating successful oxygen elimination.

Thus, in one presently preferred embodiment, prior to operation of the fuel cell, the open circuit voltage is tested. If this open circuit voltage is lower than a predetermined threshold, the system determines that a recirculation mode of operation using a low flow hydrogen supply should be initiated prior to entering normal operating mode. In a further embodiment, the open circuit voltage is continuously monitored during the recirculation mode until the open circuit voltage exceeds a predetermined threshold.

In a further embodiment, the oxygen level may be detected by monitoring the temperature of the reaction chamber, or outlet thereof, using an appropriate thermocouple or thermistor. During the period when oxygen is being reacted with fuel in the reaction chamber, the temperature of the reaction chamber, or of the gas flow exiting the reaction chamber, will continue to rise. Once the temperature rise ceases, begins to fall or slows below a predetermined rate of increase, it can be determined that the oxygen level has reduced to below an appropriate threshold indicating that the fuel cell may be brought into normal operating mode.

Once the oxygen has been removed, the hydrogen flow rates can be increased to such levels as are consistent with normal power delivery from the fuel cell and normal operation can begin.

Figure 4:
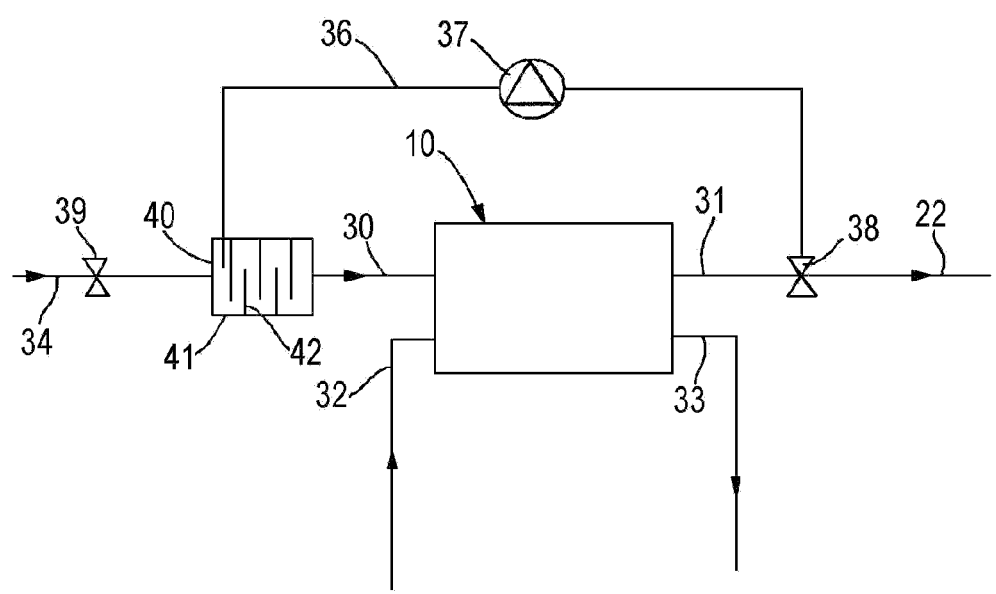
FIG. 4 is a schematic diagram of a second arrangement of an oxygen removal system according to the present invention.

With reference to FIG. 4, an alternative method of achieving oxygen removal from the fuel delivery path is to utilize the oxygen in a controlled combustion of hydrogen internally of the fuel cell.

In this embodiment, the reaction chamber 35 is removed and the recycle loop 36 delivers the recirculated gas stream to a mixing point 40 where it is mixed with the controlled low flow bleed of hydrogen fuel from fuel system inlet 34 and flow regulator 39.

Preferably, the mixing point 40 comprises a pre-mixing chamber 41 incorporating a plurality of mixing baffles 42 or other suitable physical structure to encourage a thorough mixing of fuel fluid with recirculation fluid prior to entry into the fuel cell. In this manner, a very controlled, low level reaction can be effected at the anode of the fuel cell in such a manner as to avoid any significant level of damage to the fuel cell.

This relies on the catalytic activity at the anode surface in the fuel cell 10 to promote the reaction of fuel and oxidant in situ. Provided that close control of hydrogen dosing is observed and good pre-mixing before entry into the fuel cell occurs, then localized heating effects within the anode will be avoided and good reaction distribution will occur avoiding damage to the fuel cell.

The metered hydrogen fuel may comprise a hydrogen rich gas, for example, a hydrogen and inert diluent fluid mixture, offering further improvement in fuel and oxidant mixing.

Similar to the embodiment of FIG. 3, automatic control means may be provided for determining when the recirculation mode is to be initiated, and for how long, prior to switching to a normal mode of operation.

A further aspect of preventing or limiting damage to the membrane-electrode assembly is to ensure that fuel delivered to the anode is provided at an optimum temperature and/or humidity. During a start up phase, control of the temperature and/or humidity of the fuel stream can also accelerate the process of achieving an optimum operating condition in the fuel cell.

Figure 5:
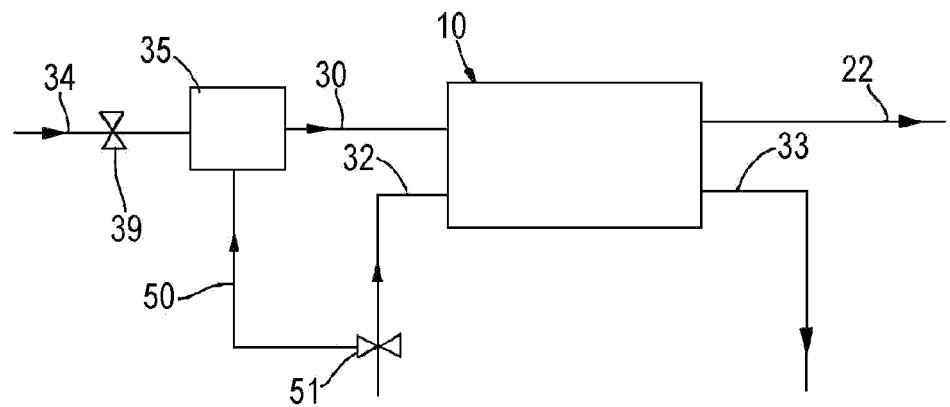
FIG. 5 is a schematic diagram of a preconditioning system for controlled combustion of fuel and oxidant in a fuel delivery conduit according to the present invention.

With reference now to FIG. 5, an adaptation of the process described in connection with FIG. 3 can be made to pre-condition the fuel flow by introducing water or steam to improve or maintain humidity in the fuel gas stream. A further benefit of this arrangement is that the temperature of the fuel stream can also be controlled.

To achieve this fuel pre-conditioning, provision is made to deliver oxidant (eg. air) into the reaction chamber 35 to deliberately increase the reaction of hydrogen with oxygen for the purpose of producing water and heat.

An oxidant supply line 50 is connected to supply of suitable oxidant. In the preferred embodiment shown, this supply is conveniently the same source of oxidant used to supply the cathode, namely the oxidant supply conduit 32. The oxidant supply line 50 is coupled thereto by a valve 51, which may also incorporate a flow regulator (not shown separately). This system configuration may be used with or without the recycle loop 36 depicted in FIGS. 3 and 4.

The provision of controlled quantities of oxidant to the reaction chamber 35 results in a predetermined rate of reaction of hydrogen and oxygen in the reaction chamber, thereby enabling control of the temperature and humidity of the fuel gas being fed to the fuel cell 10 anode via fuel delivery conduit inlet 30 (assuring, of course, that the fuel supply from flow regulator 39 provides excess fuel to that required by the oxidant supply).

The flow of water or water vapour to the fuel cell 10 (and its continued recirculation if used in combination with the recycle loop 36) allows the hydration state of the membrane to be controlled hence maintaining conductivity by use of a pre-conditioned fuel stream.

This facility is particularly useful in the operation of fuel cells of open cathode design, which are prone to membrane dehydration when not operated for extended periods of time.

Energy is liberated in the course of the reaction in reaction chamber 35 and therefore offers the opportunity to deliver heat directly to the fuel cell or any other part of the associated system by means of heat exchange/transfer mechanisms. This may be of particular use when starting a fuel cell from cold where the rapid elevation of temperature will ensure a shorter time to normal operational temperature and maximum power capability.

In any case the use of a catalytic reactor, upstream of fuel gas introduction and/or in a recirculation loop provides the additional flexibility of controlling fuel gas humidity and introducing heat via the gas stream.

Figure 6:
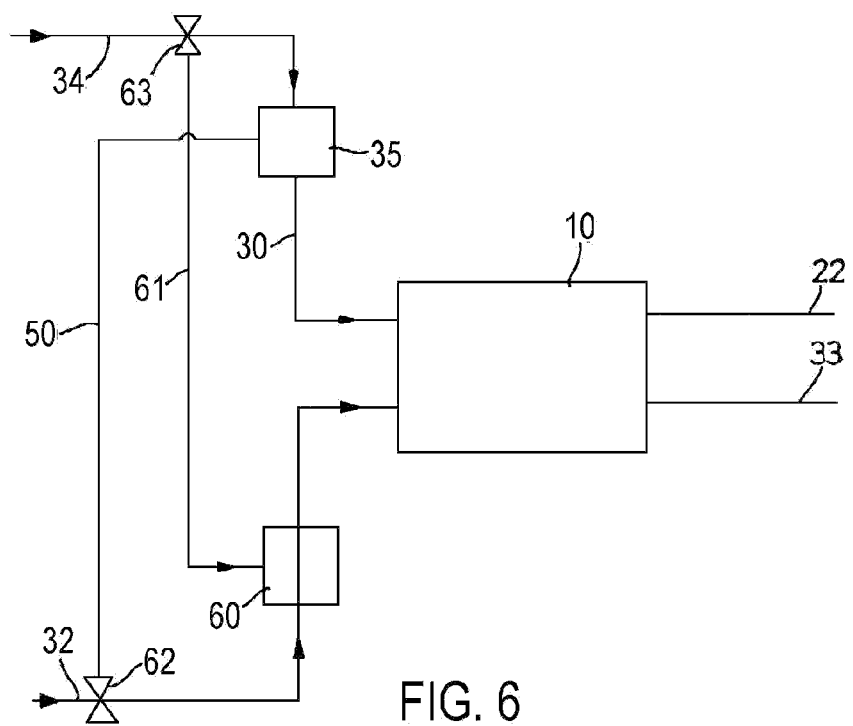
FIG. 6 is a schematic diagram of a further preconditioning system for controlled combustion of fuel and oxidant in a fuel delivery conduit according to the present invention.

With reference to FIG. 6, a further arrangement is shown that allows for provision of humidification and pre-heating of both the fuel flow to the anode of the fuel cell 10, and separate humidification and pre-heating of oxidant flow to the cathode of the fuel cell 10.

In this arrangement, the fuel system inlet 34 is coupled to feed a first reaction chamber 35 within the fuel delivery conduit 30, which is supplied by an oxidant supply line 50. The oxidant supply conduit 32 incorporates a second reaction chamber 60 which is supplied by a fuel supply line 61. Appropriate valves 62, 63 control the flow of oxidant and fuel to respective first and second reaction chambers 35, 60, which valves may also include flow regulators for varying flow rate according to a desired degree of humidification and/or pre-heat.

It will be understood that either or both of the first and second reaction chambers could be used independently of the other. In addition, the system of FIG. 6 could also be used in conjunction with a recycle loop as described in connection with FIG. 3.

The preconditioning mode of operation described in connection with FIGS. 5 and 6 may be initiated according to any desired prevailing condition. These conditions may include any one or more of the following: (i) automatic detection of a period of non-use of the fuel cell exceeding a predetermined elapsed time threshold; (ii) automatic detection of a period of use of the fuel cell exceeding a predetermined elapsed the threshold; (iii) automatic detection of a service condition, ie. after detection of a fuel cell maintenance condition; (iv) automatic detection of a predetermined temperature or humidity condition in the fuel delivery conduit or fuel cell, and (v) manual initiation, by a user.

The preconditioning mode of operation may continue automatically for a predetermined period of time, indefinitely, or may be continued automatically until detection of a suitable temperature or humidity condition in the fuel delivery conduit or fuel cell. Alternatively, the duration of the preconditioning mode may be controlled manually by the user.

Throughout the present specification, for convenience the fuel cell 10 has been described in terms of only a single anode, membrane and cathode. However, it will be understood that, in accordance with conventional fuel cell design, multiple membrane-electrode assemblies are used in series or in parallel in a stack in order to increase the voltage and/or current supply. In accordance therewith, the fuel delivery conduit typically incorporates a plurality of anode fluid flow field plates, and the oxidant supply conduit typically incorporates a plurality of cathode fluid flow field plates. The principles of the present invention apply equally to such membrane-electrode assembly stacks.

The invention has been described with reference to a conventional MEA comprising a polymer membrane, but is also relevant to other types of fuel cell.

Other embodiments are within the accompanying claims.

The invention claimed is:

1. A fuel cell system comprising:
    a fuel cell comprising an anode, a cathode, and an ion exchange membrane between the anode and the cathode;
    a fuel delivery conduit comprising:
        a fluid flow field plate forming part of the anode, having a fluid flow channel extending through the fluid flow plate;
        a fuel delivery inlet coupled to one end of the fluid flow channel;
        a fuel delivery outlet coupled another end of the fluid flow channel; and
        a fluid flow regulator for controllably varying a quantity of fuel delivered to a mixing point adjacent to the fuel delivery inlet;
    a recirculation conduit for the anode, the recirculation conduit extending between the fuel delivery outlet and the fuel delivery inlet via the mixing point, wherein the mixing point is external to the fuel cell and comprises either (i) a reaction chamber for reacting fuel, or (ii) a pre-mixing chamber, the mixing point for mixing fuel from the fluid flow regulator with oxidant species from the recirculation conduit; and
    detection means for detecting a level of oxidant species present in at least part of the fuel delivery conduit, wherein the detection means comprises means for testing an open circuit voltage across the anode and cathode of the fuel cell.

2. A fuel cell system according to claim 1, wherein the reaction chamber includes a catalyst material.

3. A fuel cell system according to claim 1, wherein the recirculation conduit is switchably connected to the fuel delivery outlet via a two way valve.

4. A fuel cell system according to claim 1, further comprising:
    control means for switching the fuel cell between a normal mode of operation in which a relatively high flow rate of fuel is delivered to the anode and oxidant is delivered to the cathode, and a recirculation mode in which a relatively low flow rate of fuel is delivered to the anode together with oxidant delivered via the recirculation conduit.

5. The fuel cell system of claim 4, wherein the control means is responsive to the open circuit voltage.

6. A fuel cell system according to claim 1, further comprising:
    control means for switching the fuel cell between a normal mode of operation in which a relatively high flow rate of fuel is delivered to the anode and oxidant is delivered to the cathode, and a recirculation mode in which a relatively low flow rate of fuel is delivered into the fuel delivery conduit together with oxidant delivered via the recirculation conduit.

7. The fuel cell system of claim 6, wherein the control means is responsive to the open circuit voltage.

8. A fuel cell system according to claim 1, further comprising:
    an oxidant supply conduit extending from an oxidant supply to the mixing point.

9. A fuel cell system according to claim 8, further comprising:
    an oxidant flow regulator for controllably varying a quantity of oxidant delivered to the mixing point.

10. A fuel cell system according to claim 9, wherein the oxidant flow regulator comprises a valve coupling the oxidant supply conduit to a cathode oxidant delivery conduit.

11. A fuel cell system according to claim 8, wherein the mixing point comprises a reaction chamber for reacting fuel from said fluid flow regulator with oxidant species from said oxidant supply conduit.

12. A fuel cell system according to claim 11, wherein the reaction chamber includes a catalyst material.

13. A fuel cell system according to claim 1, further comprising:
    means for effecting a controlled combustion of fuel and oxidant species within a cathode fluid delivery conduit.

14. A fuel cell system according to claim 13, wherein the cathode fluid delivery conduit comprises:
    a fluid flow field plate forming part of the cathode, the fluid flow field plate comprising a fluid flow channel extending through the fluid flow field plate;
    an oxidant delivery inlet coupled to one end of the cathode fluid flow conduit; and
    an exhaust outlet coupled to another end of the cathode fluid flow conduit.

15. A fuel cell system according to claim 14, wherein the means for effecting a controlled combustion within a cathode comprises a fuel supply conduit extending from a fuel supply to a mixing point in the oxidant delivery inlet.

16. A fuel cell system according to claim 15, wherein the mixing point comprises a reaction chamber for reacting fuel from the fuel supply conduit with oxidant species from said oxidant supply.

17. A fuel cell system comprising:
- a fuel cell comprising an anode, a cathode, and an ion exchange membrane between the anode and the cathode;
- a fuel delivery conduit comprising:
  - a fluid flow field plate forming part of the anode, the fluid flow plate comprising a fluid flow channel extending through the fluid flow plate;
  - a fuel delivery inlet coupled to one end of the fluid flow channel; and
  - a fuel delivery outlet coupled another end of the fluid flow channel;
- a recirculation conduit for the anode, the recirculation conduit extending between the fuel delivery outlet and the fuel delivery inlet via a mixing point adjacent to the fuel delivery inlet; and
- detection means for detecting a level of oxidant species present in at least part of the fuel delivery conduit, wherein the detection means comprises means for testing an open circuit voltage across the anode and cathode of the fuel cell;
- wherein the mixing point is external to the fuel cell and comprises either (i) a reaction chamber for reacting fuel, or (ii) a pre-mixing chamber, the mixing point for mixing fuel from a fluid flow regulator with oxidant species from the recirculation conduit.

18. A fuel cell system according to claim 17, further comprising:
- the fluid flow regulator for controllably varying the quantity of fuel delivered to the mixing point.

19. A fuel cell system according to claim 18, wherein the mixing point comprises a reaction chamber for reacting fuel from the fluid flow regulator with oxidant species from the recirculation conduit.

20. A fuel cell system according to claim 18, wherein the mixing point comprises a pre-mixing chamber for mixing fuel from the fluid flow regulator with oxidant species from the recirculation conduit.

21. A fuel cell system according to claim 17, wherein the recirculation conduit is switchably connected to the fuel delivery outlet via a two way valve.

22. A fuel cell system according to claim 17, further comprising:
- control means for switching the fuel cell system between a normal mode of operation in which a relatively high flow rate of fuel is delivered to the anode and oxidant is delivered to the cathode, and a recirculation mode in which a relatively low flow rate of fuel is delivered to the anode together with oxidant delivered via the recirculation conduit.

23. The fuel cell system of claim 22, wherein the control means is responsive to the open circuit voltage.

24. A fuel cell system according to claim 17, further comprising:
- control means for switching the fuel cell system between a normal mode of operation in which a relatively high flow rate of fuel is delivered to the anode and oxidant is delivered to the cathode, and a recirculation mode in which a relatively low flow rate of fuel is delivered into the fuel delivery conduit together with oxidant delivered via the recirculation conduit.

25. The fuel cell system of claim 24, wherein the control means is responsive to the open circuit voltage.

26. A fuel cell system comprising:
- a fuel cell having an anode, a cathode, and an ion exchange membrane between the anode and the cathode;
- a fuel delivery conduit for delivering preconditioned fuel to the anode, comprising:
  - a reaction chamber for reacting fuel and oxidant;
  - a fuel supply inlet for delivering fuel to the reaction chamber;
  - an oxidant supply inlet for supplying oxidant to the reaction chamber; and
  - a reaction chamber outlet connected to the anode;
- wherein the reaction chamber is external to the fuel cell and is adapted so that at least a part of the fuel supply delivered to the reaction chamber is reacted with the oxidant supplied to the reaction chamber to precondition fuel being delivered to the anode;
- wherein the fuel delivery conduit further comprises a recirculation conduit to supply oxidant from an output of the fuel cell to the reaction chamber;
- wherein the reaction chamber is configured to mix fuel from the fuel supply inlet with oxidant species from the recirculation conduit; and
- detection means for detecting a level of oxidant species present in at least part of the fuel delivery conduit, wherein the detection means comprises means for testing an open circuit voltage across the anode and cathode of the fuel cell.

27. A fuel cell system according to claim 26, further comprising:
- control means for controllably varying a flow rate of one or both of the fuel and oxidant from the oxidant supply inlet in order to achieve a predetermined degree of humidification of a fuel stream delivered to the anode.

28. A fuel cell system according to claim 26 further comprising:
- control means for controllably varying the flow rate of one or both of the fuel and oxidant from the oxidant supply inlet in order to achieve a predetermined degree of preheat of a fuel stream delivered to the anode.

* * * * *